US 6,627,699 B2

(12) United States Patent
Sawitski, Jr. et al.

(10) Patent No.: US 6,627,699 B2
(45) Date of Patent: Sep. 30, 2003

(54) PREPOLYMER FORMULATIONS HAVING IMPROVED OIL COMPATIBILITY

(75) Inventors: Robert G. Sawitski, Jr., Taylor, MI (US); David R. MacFarland, deceased, late of Rochester Hills, MI (US), by Marilyn MacFarland, legal representative

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/940,385

(22) Filed: Aug. 28, 2001

(65) Prior Publication Data

US 2002/0103289 A1 Aug. 1, 2002

Related U.S. Application Data

(60) Provisional application No. 60/228,120, filed on Aug. 28, 2000.

(51) Int. Cl.[7] .............................. C08J 3/00; C08K 3/34; C08L 75/00

(52) U.S. Cl. ..................... 524/871; 524/474; 524/476; 524/485; 524/486; 524/589; 524/590

(58) Field of Search ................................. 524/589, 590, 524/474, 476, 485, 486, 871

(56) References Cited

U.S. PATENT DOCUMENTS 3,846,355 A * 11/1974 Mayer
4,008,197 A    2/1977 Brauer et al.
6,303,731 B1 * 10/2001 Carlson et al.

FOREIGN PATENT DOCUMENTS

DE       4313781       8/1994

* cited by examiner

Primary Examiner—Patrick D. Niland
(74) Attorney, Agent, or Firm—Nicole Graham

(57) ABSTRACT

Prepolymer formulations having improved oil compatibility are disclosed. The prepolymer formulations are fabricated with flexible polyether diol. The prepolymer formulations are useful, for example, as binder material for polyurethane foam crumb.

10 Claims, No Drawings

PREPOLYMER FORMULATIONS HAVING IMPROVED OIL COMPATIBILITY

This application claims the benefit under 35 U.S.C. Section 119(e,) of U.S. Provisional Application Ser. No. 60/228,120, filed Aug. 28, 2000, entitled "Prepolymer Formulations Having Improved Oil Compatibility", the subject matter of which is herein incorporated by reference.

FIELD OF THE INVENTION

The invention relates to improved polyurethane formulations, particularly to polyurethane prepolymer formulations which have improved compatibility with process oils.

BACKGROUND OF THE INVENTION

During manufacture of polyurethane prepolymers such as those for rebonding of recycled flexible polyurethane foam crumb, a process oil such as naphthenic oil is included in the prepolymer formulation in amounts of about 5 to 50% by weight to lower the surface tension of the prepolymer, as well as to achieve a prepolymer that has a room temperature viscosity of about 300 to about 4000 cP.

The viscosity of the polyurethane prepolymer depends upon variables such as polyol functionality, polyol molecular weight, isocyanate functionality, isocyanate type, and isocyanate value of the prepolymer. The process oils provide an additional means for controlling the viscosity of the prepolymers.

The rebonding of flexible polyurethane foam crumb has traditionally been achieved by mixing the crumbs of recycled flexible foam with a liquid isocyanate terminated prepolymer blend containing a process oil. The prepolymers have conventionally been made from the reaction of TDI or MDI isocyanates and flexible polyether triols. The triols typically have molecular weights between about 300 and about 8000, and more typically from about 1000 to about 6000. They have nominal functionalities of 3. These flexible polyether polyols contribute essential flexibility to the adhesive bond. These polyols are based on propylene oxide or combinations of propylene oxide with minor amounts of ethylene oxide. The polyols are made by polyaddition of a trifunctional initiator species, most typically glycerol or trimethylolpropane, with the appropriate amounts of the alkylene oxide(s) in order to achieve the desired molecular weight in the final polyol. The resulting polyols are nominally trifunctional (triols). The technology for manufacturing these flexible polyether polyols, and derived isocyanate terminated prepolymers, is well known in the art.

Process oils which have been added to polyurethane prepolymer formulations include naphthenic, paraffinic, and aromatic oils. Aromatic oils have been the industry standard; aromatic oils, however, suffer the disadvantage of being labeled as possible carcinogens. Naphthenic and paraffinic oils, however, exhibit much lower compatibility in polyurethane prepolymer formulations than aromatic oils. As a result, prepolymer formulations which employ naphthenic and paraffinic oils tend to be less stable with respect to oil separation on storage than formulations which employ aromatic oils.

A need therefore exists for polyurethane formulations which have improved compatibility and/or solubility of oils such as naphthenic and paraffinic oils.

SUMMARY OF THE INVENTION

The invention relates to improved prepolymer formulations which include polyurethane prepolymers containing process oil, and optionally a compatibilizing agent provided in an effective amount to increase the solubility of the oil in the polyurethane prepolymer. The improved prepolymer formulations are useful, for example, as binder material for polyurethane foam crumb. It has now been unexpectedly and surprisingly discovered that the compatibility of the process oils, and particularly of the so called napthenic oils, can be significantly enhanced by using a flexible polyether diol, instead of a triol, to make the isocyanate terminated prepolymer.

The process of making the improved prepolymer formulations includes the steps of:

(a) providing an isocyanate terminated polyurethane prepolymer comprising the reaction product of a nominal polyether diol with a molar excess of organic polyfunctional isocyanate monomer (base isocyanate), said polyether diol having a number averaged terminal hydroxyl functionality of from 1.3 to 2.1 and being essentially free of other types of active hydrogen functionality;

(b) providing a process oil;

(c) optionally providing a compatibilizing agent for the process oil; and (d) combining together the polyurethane prepolymer, process oil and optional compatibilizing agent.

DETAILED DESCRIPTION OF THE INVENTION

Glossary

1. ARCOL® F 3022 is a 3000 molecular weight polyether triol with a hydroxyl number of 56.0 and a nominal functionality of 3 from Lyondell Chemical Company;
2. Calsol 804 is a naphthenic oil from Calumet Lubricants Company with an aniline point of 63.3° C.;
3. Calsol 806 is a naphthenic oil from Calumet Lubricants Company with an aniline point of 69.4° C.;
4. Calsol 810 is a naphthenic oil from Calumet Lubricants Company with an aniline point of 72.2° C.;
5. Calsol 850 is a naphthenic oil from Calumet Lubricants Company with an aniline point of 80.0° C.;
6. Calsol 8240 is a naphthenic oil from Calument Lubricants Company with an aniline point of 85.6° C.;
7. Compatibilizing Agent means any material which will increase a process oil's compatibility in a polyurethane prepolymer, relative to what it would have been without the compatibilizing agent. Process oil compatibility in prepolymers, and quantification thereof, is defined in detail in the specification (below);
8. Corn oil is a mixture of triglycerides based on 10% palmitic acid, 5% stearic acid, 45% oleic, and 38% linoleic acid;
9. Cyclolube 310 N is a naphthenic oil from Golden Bear with an aniline point of 77.8° C.;
10. Calight RPO is naphthenic oil from Calumet Lubricants with an aniline point of 72.2° C.;
11. DABCO® 120 is a tin catalyst from Air Products, Inc.;
12. DABCO® T45 is a PIR (polyisocyanurate) catalyst from Air Product, Inc.;
13. Hyprene V100 (also available as Hyprene H100)is naphthenic oil from Ergon, Inc. with an aniline point of 72.8° C.;
14. Linseed oil is a mixture of triglycerides based on 6% palmitic acid, 3% stearic acid, 19% oleic acid, 24% linoleic acid, and 47% linolenic acid;
15. LG-168 is a 1000 molecular weight polyether triol from Lyondell Co.;
16. Palm kernal oil is a mixture of triglycerides based on 47% lauric acid, 9% palmitic acid, 1% stearic acid, 19% oleic acid, and 1% linoleic acid;

17. PPG425 is a 425 molecular weight polyether diol from Lyondell Co.;
18. PPG725 is a 725 molecular weight polyether diol from Lyondell Co.;
19. RUBINOL® F-456 is a 2000 molecular weight polyoxypropylene diol with a hydroxyl number of 56, a nominal functionality of 2, and 0% oxyethylene units; from Huntsman Polyurethanes;
20. RUBINOL® 455 is a 3,100 molecular weight polyoxypropylene-polyoxyethylene triol from Huntsman Polyurethanes; the triol contains 9% oxyethylene units, as a cap;
21. RUBINOL® F-459 is a polyoxypropylene-polyoxyethylene diol from Huntsman Polyurethanes with a hydroxyl number of 30, and containing 21% by wt. of oxyethylene units as a cap.
22. RUBINATE® M is polymeric MDI from Huntsman Polyurethanes with an isocyanate value of 31.5 and a functionality of 2.7;
23. RUBINATE® 9041, available from Huntsman Polyurethanes, is a blend of 75% RUBINATE® M and 25% of a blend of 4,4'MDI and 2,4'MDI;
24. RUBINATE® 9471, available from Huntsman Polyurethanes, is a blend of 60% RUBINATE® M and 40% of a blend of 4,4'MDI and 2,4'MDI and 0.14% HCl;
25. SHELLFLEX® 3251 is naphthenic oil from Shell Oil Products Co. with an aniline point of 85.6° C.;
26. SHELLFLEX® 6212 is naphthenic oil from Shell Oil Products Co. with an aniline point of 67.8;
27. Soya bean oil is a mixture of triglycerides based on 12% palmitic acid, 4% stearic acid, 21% oleic acid, 53% linoleic acid, and 7% linolenic acids;
28. Sundex 840 is an aromatic oil from Sun Oil Company with an aniline point of 15.7° C.;
29. Sunflower oil is a mixture of triglycerides based on 6% palmitic acid, 4% stearic acid, 18% oleic acid, and 72% linoleic acid;
30. SUNPAR® LW103 is a paraffinic oil from Sun Oil Company with an aniline point of 60.5° C.;
31. SUNPAR® LW104 is a paraffinic oil with an aniline point of 69.0° C.;
32. SUNPAR® LW105 is a paraffinic oil with an aniline point of 77.8° C.;
33. SUNPAR® LW107 is a paraffinic oil with an aniline point of 90.6° C.;
34. SUNPAR® LW110 is a paraffinic oil with an aniline point of 101.7° C.;
35. TEGOSTAB® B-8240, available from Goldschmidt Co., is a polyether Polysiloxane copolymer surfactant. It has a siloxane to polyether ratio of 1:2–1:4, a molecular weight of polyether chains of 600–5000, and a EO/PO ratio of 1:1 to 1:2.3 (50–70% PO by weight of the alkoxide). The types of end groups on polyethers in TEGOSTAB® B-8240 are such that the product has a free OH functionality of less than 2.1 with the remaining Polyethers being blocked/capped by either an ether, ester or urethane group;
36. VORANOL® 235-048 is a 3,500 molecular weight polyether triol with a hydroxyl number of 48.1 and a nominal functionality of 3 from Dow Chemical Company;
37. VORANOL® 3512 is a 3,500 molecular weight polyether triol with a hydroxyl number of 48.1 and a nominal functionality of 3 from Dow Chemical Company;
38. VORANOL® 3512A is polyether polyol with a hydroxyl number of 48.1 and a nominal functionality of 3 from Dow Chemical Company.
39. The viscosities referred to herein are Brookfield viscosities (measured at 25° C., and reported in cps) unless otherwise specified. We use a Brookfield LVF viscometer using the appropriate spindle and speed for the viscosity of the material. Viscosity is measured at the indicated temperature and the sample is in a 16 oz. glass jar. The ASTM procedure for Brookfield viscosity is ASTM D 4889. The one exception to the method we use is that we use 16 oz. jars not the quart jar that they mention. Viscosity samples are 400 g unless otherwise specified. This is the definition of the term "viscosity" as referred to in the claims.

Materials

Isocyanates

Organic monomeric polyisocyanates which are useful as the base isocyanates in making the prepolymer formulations of the invention include aromatic, aliphatic and cycloaliphatic diisocyanates and polyisocyanates and combinations of these types.

Aromatic diisocyanates which may be used include 4,4'MDI, 3,3'-dimethyl-4,4'-diphenylenediisocyanate, 3,3'-dimethoxy-4,4'-bisphenylenediisocyanate, 3,3'-diphenyl-4,4'-biphenylenediisocyanate, 4,4'-biphenylene diisocyanate, 4-chloro-1,3-phenylene diisocyanate, 3,3'-dichloro-4,4'-biphenylene diisocyanate, toluene diisocyanate, and 1,5-naphthalene diisocyanate. MDI isocyanates are preferred. Polymeric MDI having about 31.5% NCO and about 2.7 functionality is most preferred. Polymeric MDI is a combination of monomeric isocyanates which includes 4,4'-MDI, lesser amounts of 2,4'-MDI, minor amounts of 2,2'-MDI, and a mixture higher functionality polymethylene polyphenyl polyisocyanate oligomers. The preferred polymeric MDI has a number averaged isocyanate functionality of 2.7, due to the presence of the mixed high functionality polymethylene polyphenyl polyisocyanate monomer species. Polymeric MDI is prepared by the phosgenation of mixed aromatic amines obtained from the condensation of aniline with formaldehyde. The preparation of polymeric MDI is well known in the art. It is also within the invention to use blends of polymeric MDI with additional amounts of diphenylmethane diisocyanates, particularly 4,4'-MDI. These blends will have number averaged isocyanate functionalities of from greater than 2.0 to about 2.7, depending upon the ratio of the diphenylmethane diisocyanates to the polymethylene polyphenyl polyisocyanates in the blend.

Aliphatic isocyanates which may be employed include but are not limited to ethylene diisocyanate, 1,4-tetramethylene diisocyanate, 1,6-hexamethylene diisocyanate (HDI), 2,4,4-tri-methyl-1,6-hexamethylene diisocyanate, and 1,12-dodecane diisocyanate.

Cycloaliphatic isocyanates which may be employed include but are not limited to cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4'-dicyclohexylmethane diisocyanate, 4,4'-dicyclohexylmethane diisocyanate.

Isocyanate Reactive Component [Polyether Nominal Diols]

Suitable organic polyols for use as the isocyanate reactive component in preparing the polyurethane prepolymer formulations of the invention consist essentially of polyether polyols of nominal functionality 2 and having molecular weights (number averaged) of from 300 to 8000, preferably 1000 to 6000. These nominal diols have actual (number averaged) functionalities ranging from 1.3 to 2.1, preferably 1.5 to 2.0, more preferably 1.7 to 2.0, and most preferably 1.8 to 2.0. Polyether nominal diols which may be employed in preparing the prepolymers of the invention may include primary or secondary hydroxyl groups.

All functionalities and molecular weights described herein with respect to polymeric materials are "number average". All functionalities and molecular weights described with respect to pure compounds are "absolute". The term "nominal functionality" as employed herein, with respect to the polyether diols used in making the prepolymers of the invention, refers to the functionality of the initiator molecule used in making the polyether polyol. For example, the "nominal functionality" of a polyether polyol formed by adding alkylene oxides onto a low molecular weight diol is always 2 (diol), even if the actual (number averaged) functionality of the polyether polyol so formed may be somewhat less than 2 (due to well known side reactions).

Suitable polyether nominal diols which can be employed as the isocyanate reactive component for making the prepolymers of the invention include those which are prepared by reacting alkylene oxides, halogen-substituted or aromatic-substituted alkylene oxides or mixtures thereof with an active hydrogen-containing initiator compound.

Suitable oxides include, for example, ethylene oxide, propylene oxide, 1,2-butylene oxide, styrene oxide, epichlorohydrin, epibromohydrin, and mixtures thereof. The preferred alkylene oxides are propylene oxide and ethylene oxide, and propylene oxide is most preferred. The nominal diols most preferred are derived predominantly from propylene oxide with optional minor amounts of other alkylene oxides such as ethylene oxide. Diols based entirely on propylene oxide, and containing no ethylene oxide, are the most preferred. The diols are formed by reaction of the alkyene oxide(s) with a difunctional low molecular weight initiator or a mixtures of such difunctional initiators.

Suitable initiator compounds include low molecular weight species containing two active hydrogen atoms; such as water, ethylene glycol, propylene glycol, butanediol, butenediol, butynediol, hexanediol, bisphenols, diethylene glycol, dipropylene glycol, tripropylene glycol, triethylene glycol, methylamine, aniline, ethylamine, propylamine, butylamine, mixtures of these, and like difunctional active hydrogen species. The most preferred difunctional initiator species are water and diols of 10 carbons or less which contain only carbon, hydrogen, and oxygen.

Most preferably polyether nominal diols which have a molecular weight of about 1,500 to about 3,500 are used. Blends of these polyols also may be employed.

It is within the scope of the invention, although considerably less preferred, to include minor amounts of other types of active hydrogen species in the synthesis of the prepolymers of the invention. For example, minor amounts of polyether nominal triols or even higher functionality polyether polyols may be used, as long as the combined number averaged functionality of all the active hydrogen species that go into the prepolymer is not greater than 2.1. Polyester polyols may be included (preferably polyester diols) as long as these are present in minor amounts, on a molar basis, relative to the polyether nominal diols defined hereinabove, and the number averaged functionality of all the active hydrogen species (combined) going into the prepolymer is not greater than 2.1. Polyols of molecular weight less than 300 may be included in minor amounts on a molar basis, provided that the combined number averaged functionality of all the active hydrogen species going into the prepolymer is not greater than 2.1. Active hydrogen species other than polyols may be included in minor amounts, on a molar basis, provided that the combined number average functionality of all active hydrogen species (including the diols) is not greater than 2.1. The polyether nominal diols, as defined hereinabove, should be the predominant active hydrogen species used in making the prepolymers of the invention. The amount of these diols should exceed, on a molar basis, all other active hydrogen species present. Ideally, the nominal polyether diols, as defined above, are the sole active hydrogen species used in the production of the prepolymers of the invention. Ideally the active hydrogen species used in preparing the prepolymers of the invention should be free of anything having an active hydrogen functionality of greater than 2.

Optional Compatibilizing Agent

Any material that is capable of further increasing the compatibility of the process oil in the polyurethane prepolymer can be used. Preferably, the compatibilizing agent, if used at all, is a silicone containing or silicone-based material. Silicone-based surfactants are particularly preferred. Most preferable are polysiloxane surfactants.

A single polysiloxane surfactant is preferred. Preferred polysiloxane surfactants are polysiloxane-polyether copolymers. In an alternative embodiment, blends of polysiloxane surfactants and blends of polysiloxane surfactant(s) with non-polysiloxane surfactants may be used. TEGOSTAB® B-8240 from Goldschmidt is the most preferred polysiloxane surfactant.

Process Oil

The process oil may be any suitable oil. For example, suitable oils can be selected from the group consisting of naphthenic oils, aliphatic oils, paraffinic oils, natural oils and mixtures thereof. The process oils employed in the prepolymer formulations of the invention typically have a lower viscosity than the viscosity of the polyurethane prepolymer itself.

Naphthenic, paraffinic, aliphatic and natural oils are well known in the art. In addition, there are no apparent carcinogenic concerns linked to natural oils, naphthenic oils or paraffinic oils. Thus, these oils are particularly attractive as replacements for aromatic oils.

Polyurethane Prepolymer Manufacture

The isocyanate and isocyanate reactive components may be reacted over a wide stoichiometric range to produce prepolymers having reactive isocyanate groups. During manufacture of the polyurethane prepolymers of the invention, process oil can be added to the polyurethane prepolymer formulation in amounts of about 5% to about 50% based on the weight of the prepolymer formulation. Preferably, the final prepolymer formulation has 20% to 35% by wt. process oil, relative to the total weight of the final prepolymer composition [including the prepolymer itself, the process oil, and any optional compatibilizing agents used].

The amount of optional compatibilizing agent in the polyurethane prepolymer formulations may vary, so long as that, when it is needed, it is provided in an effective amount to increase the oil compatibility in the prepolymer relative to what it would be without the compatibilizing agent present. Generally, the amount of compatibilizing agent may vary from about 0% to about 10% by weight of the final polyurethane prepolymer formulation [including the prepolymer itself, the process oil, and the compatibilizing agent]. Preferably, about 0.10 wt. % by weight to about 10% by wt. of compatibilizing agent based on the weight of the final polyurethane prepolymer formulation is used. The most preferred compatibilizing agent is the commercial silicone surfactant TEGOSTAB® B-8240 (available from Th. Goldschmidt & Co.). The most preferred range of concentrations for this compatibilizing agent is 0.2% to 2% by wt. of the final prepolymer. The compatibilizing agent may be added to any of the components of the prepolymer. For example, the compatibilizing agent may be added to the isocyanate, the polyol, the process oil, as well as to the isocyanate terminated prepolymer itself after it is formed.

The term "final prepolymer" as used herein refers to the prepolymer with the desired amount of process oil and with the optional compatibilizing agent (if the compatibilizing agent is used) included. All percentages by weight quoted herein are relative to the final prepolymer. The term "prepolymer itself" as used herein refers to the prepolymer without any process oil or optional compatibilizing agent.

The process oil is said to be compatible with the prepolymer to the extent that it does not separate during storage under a fixed set of conditions. The compatibility of course depends upon the final prepolymer composition. A prepolymer composition is said to be compatible if it does not show visible oil separation on storage for three days at ambient temperature (typically 30° C.) under dry air without agitation. Comparisons of relative compatibility of different formulations may be made for shorter storage times, provided of course that the storage times and conditions are the same. Compatibility is resistance to bulk separation, and is not necessarily synonymous with solubility. Preferably the process oil has higher compatibility with the prepolymer than it does with the monomeric base polyisocyanate composition. Preferably the process oil has an aromatic hydrocarbon concentration of less than 50% by wt., and more preferably less than 40% by wt. The preferred process oils are selected from the group consisting of oils not listed as suspect carcinogens (or as carcinogens).

The invention will now be illustrated by reference to the following non-limiting examples. In these examples the process oil is added to the polyurethane prepolymer formulation that includes isocyanate, isocyanate reactive component (polyether diol), and any optional compatibilizing agent which may be used. All amounts of ingredients quoted in the examples are in percent by weight, unless indicated otherwise in the tables. The isocyanate and diol components are mixed together and reacted at 45° C. for 15 hours. In order to reproduce the simple method of prepolymer preparation used in the foam re-bond industry, the prepolymer samples were mixed in bulk at the appropriate weight ratios in glass jars under dry air. The prepolymer samples were prepared on a 400 g scale in 16 ounce glass jars, unless otherwise indicated. The reaction mixture was then immediately agitated by vigorous manual shaking for about 30 seconds. The jars were then placed in a convective oven set at 45° C. for 15 hours. The conversion of the reactive ingredients to urethane prepolymer was then determined to be complete by measurement of residural free isocyanate content (wt. % NCO concentration), which agreed with the predicted values. The % oil compatibility is shown in the tables. The percent oil compatibility is measured after three days storage without agitation at 30° C., unless indicated otherwise in the tables.

A prepolymer is considered to be compatible if a sample (as defined below) appears homogeneous to the naked eye (i.e. there is no visible separation of layers) after three days under the following test conditions:

A dry 16 mm×150 mm test tube is filled with 20 g of a freshly prepared prepolymer containing process oil. The tube is immediately capped (typically with a polyethylene stopper). Such samples, to be evaluated and compared, are placed in a test tube rack and the rack is placed in a 30° C. constant temperature water bath for three days, with no agitation of the samples. After three days the samples are removed from the water bath and examined for separation. If no visible separation is observed, the sample is said to be compatible. If separation is observed (the oil rises to the top of the sample) the excess oil which has separated may be removed from the sample by pipette. The sample is weighed before and after pipetting in order to measure the amount of oil which has separated. The degree of oil compatibility for that sample is then calculated by using the following formula:

Oil-Compatibility=100%{M(Oil-Added)−M(Oil-Separated)}/{M(Total)−M(Oil-Separated)}.

Wherein:

M(Oil-Added)=Mass of process oil added to make sample,

M(Oil-Separated)=Mass of process oil pipetted off (separated),

M(Total)=Initial sample mass (prepolymer+oil+any optional compatibilizer).

Clearly, if there is no visible oil separation after the three days storage then no oil is pipetted off, and the oil compatibility is equal to the percentage by weight of process oil used in making the original sample. This formula was used in determining the oil compatibility values shown in the examples below. The compatibility values quoted in these examples are after 3 days storage at 30° C. (as defined above), unless otherwise specifically indicated.

EXAMPLE TABLES

Tables I–XII

Note: The ODD numbered Tables show Examples according to the invention. The EVEN numbered Tables are comparative Examples:

TABLE I

Compatibilities of Various Naphthenic Oils in Diol Based Prepolymers with and without TEGOSTAB ® B8240 at 25-Percent Oil Loading

| | Reference Numbers | | | | | | | | | | | |
|---|---|---|---|---|---|---|---|---|---|---|---|---|
| | I-1 | I-2 | I-3 | I-4 | I-5 | I-6 | I-7 | I-8 | I-9 | I-10 | I-11 | I-12 |
| % RUBINATE ® 9041 (2.45 functionality, 31.5% NCO) | 40.57 | 40.57 | 40.57 | 40.57 | 40.57 | 40.57 | 40.54 | 40.54 | 40.54 | 40.54 | 40.54 | 40.54 |
| % RUBINOL ® F456 (2000 Mw diol, 56 OH#) | 34.43 | 34.43 | 34.43 | 34.43 | 34.43 | 34.43 | 34.26 | 34.26 | 34.26 | 34.26 | 34.26 | 34.26 |
| % Calsol 804 (63.3° C. | 25.00 | 0.00 | 0.00 | 0.00 | 0.00 | 0.00 | 25.00 | 0.00 | 0.00 | 0.00 | 0.00 | 0.00 |

TABLE I-continued

Compatibilities of Various Naphthenic Oils in Diol Based Prepolymers with and without TEGOSTAB ® B8240 at 25-Percent Oil Loading

| | Reference Numbers | | | | | | | | | | | |
|---|---|---|---|---|---|---|---|---|---|---|---|---|
| | I-1 | I-2 | I-3 | I-4 | I-5 | I-6 | I-7 | I-8 | I-9 | I-10 | I-11 | I-12 |
| Aniline Point) | | | | | | | | | | | | |
| % Calsol 806 (69.4° C. Aniline Point) | 0.00 | 25.00 | 0.00 | 0.00 | 0.00 | 0.00 | 0.00 | 25.00 | 0.00 | 0.00 | 0.00 | 0.00 |
| % Calight RPO (72.2° C. Aniline Point) | 0.00 | 0.00 | 25.00 | 0.00 | 0.00 | 0.00 | 0.00 | 0.00 | 25.00 | 0.00 | 0.00 | 0.00 |
| % Calsol 810 (72.2° C. Aniline Point) | 0.00 | 0.00 | 0.00 | 25.00 | 0.00 | 0.00 | 0.00 | 0.00 | 0.00 | 25.00 | 0.00 | 0.00 |
| % Calsol 850 (80.0° C. Aniline Point) | 0.00 | 0.00 | 0.00 | 0.00 | 25.00 | 0.00 | 0.00 | 0.00 | 0.00 | 0.00 | 25.00 | 0.00 |
| % Calsol 8240 (85.6° C. Aniline Point) | 0.00 | 0.00 | 0.00 | 0.00 | 0.00 | 25.00 | 0.00 | 0.00 | 0.00 | 0.00 | 0.00 | 25.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 25.00 | 19.60 | 17.90 | 19.80 | 22.40 | 15.40 | 25.00 | 25.00 | 25.00 | 25.00 | 25.00 | 25.00 |

TABLE II

Compatibilities of Various Naphthenic Oils in Triol Based Prepolymers with and without TEGOSTAB ® B8240 at 25-Percent Oil Loading

| | Reference Numbers | | | | | | | | | | | |
|---|---|---|---|---|---|---|---|---|---|---|---|---|
| | II-1 | II-2 | II-3 | II-4 | II-5 | II-6 | II-7 | II-8 | II-9 | II-10 | II-11 | II-12 |
| % RUBINATE ® 9041 (2.45 functionality, 31.5% NCO) | 40.50 | 40.50 | 40.50 | 40.50 | 40.50 | 40.50 | 40.47 | 40.47 | 40.47 | 40.47 | 40.47 | 40.47 |
| % RUBINOL ® F455 (3000 Mw triol, 55 OH#) | 34.50 | 34.50 | 34.50 | 34.50 | 34.50 | 34.50 | 34.33 | 34.33 | 34.33 | 34.33 | 34.33 | 34.33 |
| % Calsol 804 63.3° C. Aniline Point) | 25.00 | 0.00 | 0.00 | 0.00 | 0.00 | 0.00 | 25.00 | 0.00 | 0.00 | 0.00 | 0.00 | 0.00 |
| % Calsol 806 69.4° C. Aniline Point) | 0.00 | 25.00 | 0.00 | 0.00 | 0.00 | 0.00 | 0.00 | 25.00 | 0.00 | 0.00 | 0.00 | 0.00 |
| % Calight RPO 72.2° C. Aniline Point) | 0.00 | 0.00 | 25.00 | 0.00 | 0.00 | 0.00 | 0.00 | 0.00 | 25.00 | 0.00 | 0.00 | 0.00 |
| % Calsol 810 72.2° C. Aniline Point) | 0.00 | 0.00 | 0.00 | 25.00 | 0.00 | 0.00 | 0.00 | 0.00 | 0.00 | 25.00 | 0.00 | 0.00 |
| % Calsol 850 80.0° C. Aniline Point) | 0.00 | 0.00 | 0.00 | 0.00 | 25.00 | 0.00 | 0.00 | 0.00 | 0.00 | 0.00 | 25.00 | 0.00 |
| % Calsol 8240 85.6° C. Aniline Point) | 0.00 | 0.00 | 0.00 | 0.00 | 0.00 | 25.00 | 0.00 | 0.00 | 0.00 | 0.00 | 0.00 | 25.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 21.10 | 12.80 | 14.80 | 15.30 | 6.30 | 13.20 | 25.00 | 25.00 | 25.00 | 25.00 | 25.00 | 24.00 |

TABLE III

Compatibilities of Various Naphthenic Oils in Diol Based Prepolymers with and without TEGOSTAB ® B8240 at 30-Percent Oil Loading

| | Reference Numbers | | | | | | | | | | | |
|---|---|---|---|---|---|---|---|---|---|---|---|---|
| | III-1 | III-2 | III-3 | III-4 | III-5 | III-6 | III-7 | III-8 | III-9 | III-10 | III-11 | III-12 |
| % RUBINATE ® 9041 (2.45 functionality, 31.5% NCO) | 39.99 | 39.99 | 39.99 | 39.99 | 39.99 | 39.99 | 39.97 | 39.97 | 39.97 | 39.97 | 39.97 | 39.97 |
| % RUBINOL ® F456 (2000 Mw diol, | 30.01 | 30.01 | 30.01 | 30.01 | 30.01 | 30.01 | 29.83 | 29.83 | 29.83 | 29.83 | 29.83 | 29.83 |

TABLE III-continued

Compatibilities of Various Naphthenic Oils in Diol Based Prepolymers with and without TEGOSTAB ® B8240 at 30-Percent Oil Loading

| | Reference Numbers | | | | | | | | | | | |
|---|---|---|---|---|---|---|---|---|---|---|---|---|
| | III-1 | III-2 | III-3 | III-4 | III-5 | III-6 | III-7 | III-8 | III-9 | III-10 | III-11 | III-12 |
| 56 OH#) | | | | | | | | | | | | |
| % Calsol 804 (63.3° C. Aniline Point) | 30.00 | 0.00 | 0.00 | 0.00 | 0.00 | 0.00 | 30.00 | 0.00 | 0.00 | 0.00 | 0.00 | 0.00 |
| % Calsol 806 (69.4° C. Aniline Point) | 0.00 | 30.00 | 0.00 | 0.00 | 0.00 | 0.00 | 0.00 | 30.00 | 0.00 | 0.00 | 0.00 | 0.00 |
| % Calight RPO (72.2° C. Aniline Point) | 0.00 | 0.00 | 30.00 | 0.00 | 0.00 | 0.00 | 0.00 | 0.00 | 30.00 | 0.00 | 0.00 | 0.00 |
| % Calsol 810 (72.2° C. Aniline Point) | 0.00 | 0.00 | 0.00 | 30.00 | 0.00 | 0.00 | 0.00 | 0.00 | 0.00 | 30.00 | 0.00 | 0.00 |
| % Calsol 850 (80.0° C. Aniline Point) | 0.00 | 0.00 | 0.00 | 0.00 | 30.00 | 0.00 | 0.00 | 0.00 | 0.00 | 0.00 | 30.00 | 0.00 |
| % Calsol 8240 (85.6° C. Aniline Point) | 0.00 | 0.00 | 0.00 | 0.00 | 0.00 | 30.00 | 0.00 | 0.00 | 0.00 | 0.00 | 0.00 | 30.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 27.80 | 19.80 | 19.80 | 19.50 | 11.00 | 13.20 | 30.00 | 30.00 | 30.00 | 30.00 | 30.00 | 30.00 |

TABLE IV

Compatibilities of Various Naphthenic Oils in Triol Based Prepolymers with and without TEGOSTAB ® B8240 at 30-Percent Oil Loading

| | Reference Numbers | | | | | | | | | | | |
|---|---|---|---|---|---|---|---|---|---|---|---|---|
| | IV-1 | IV-2 | IV-3 | IV-4 | IV-5 | IV-6 | IV-7 | IV-8 | IV-9 | IV-10 | IV-11 | IV-12 |
| % RUBINATE ® 9041 (2.45 functionality, 31.5% NCO) | 39.92 | 39.92 | 39.92 | 39.92 | 39.92 | 39.92 | 39.90 | 39.90 | 39.90 | 39.90 | 39.90 | 39.90 |
| % RUBINOL ® F455 (3000 Mw triol, 55 OH#) | 30.08 | 30.08 | 30.08 | 30.08 | 30.08 | 30.08 | 29.90 | 29.90 | 29.90 | 29.90 | 29.90 | 29.90 |
| % Calsol 804 (63.3° C. Aniline Point) | 30.00 | 0.00 | 0.00 | 0.00 | 0.00 | 0.00 | 30.00 | 0.00 | 0.00 | 0.00 | 0.00 | 0.00 |
| % Calsol 806 (69.4° C. Aniline Point) | 0.00 | 30.00 | 0.00 | 0.00 | 0.00 | 0.00 | 0.00 | 30.00 | 0.00 | 0.00 | 0.00 | 0.00 |
| % Calight RPO (72.2° C. Aniline Point) | 0.00 | 0.00 | 30.00 | 0.00 | 0.00 | 0.00 | 0.00 | 0.00 | 30.00 | 0.00 | 0.00 | 0.00 |
| % Calsol 810 (72.2° C. Aniline Point) | 0.00 | 0.00 | 0.00 | 30.00 | 0.00 | 0.00 | 0.00 | 0.00 | 0.00 | 30.00 | 0.00 | 0.00 |
| % Calsol 850 (80.0° C. Aniline Point) | 0.00 | 0.00 | 0.00 | 0.00 | 30.00 | 0.00 | 0.00 | 0.00 | 0.00 | 0.00 | 30.00 | 0.00 |
| % Calsol 8240 (85.6° C. Aniline Point) | 0.00 | 0.00 | 0.00 | 0.00 | 0.00 | 30.00 | 0.00 | 0.00 | 0.00 | 0.00 | 0.00 | 30.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 25.00 | 15.30 | 13.90 | 14.60 | 11.80 | 7.90 | 30.00 | 30.00 | 30.00 | 30.00 | 30.00 | 30.00 |

TABLE V

Compatibilities of Various Naphthenic Oils in Diol Based Prepolymer with and without TEGOSTAB ® B8240 at 35-Percent Oil Loading

| | Reference Numbers | | | | | | | | | | | |
|---|---|---|---|---|---|---|---|---|---|---|---|---|
| | V-1 | V-2 | V-3 | V-4 | V-5 | V-6 | V-7 | V-8 | V-9 | V-10 | V-11 | V-12 |
| % RUBINATE ® 9041 (2.45 functionality, 31.5% NCO) | 39.42 | 39.42 | 39.42 | 39.42 | 39.42 | 39.42 | 39.40 | 39.40 | 39.40 | 39.40 | 39.40 | 39.40 |
| % RUBINOL ® F456 (2000 Mw diol, 56 OH#) | 25.58 | 25.58 | 25.58 | 25.58 | 25.58 | 25.58 | 25.40 | 25.40 | 25.40 | 25.40 | 25.40 | 25.40 |
| % Calsol 804 (63.3° C. Aniline Point) | 35.00 | 0.00 | 0.00 | 0.00 | 0.00 | 0.00 | 35.00 | 0.00 | 0.00 | 0.00 | 0.00 | 0.00 |
| % Calsol 806 (69.4° C. Aniline Point) | 0.00 | 35.00 | 0.00 | 0.00 | 0.00 | 0.00 | 0.00 | 35.00 | 0.00 | 0.00 | 0.00 | 0.00 |
| % Calight RPO (72.2° C. Aniline Point) | 0.00 | 0.00 | 35.00 | 0.00 | 0.00 | 0.00 | 0.00 | 0.00 | 35.00 | 0.00 | 0.00 | 0.00 |
| % Calsol 810 (72.2° C. Aniline Point) | 0.00 | 0.00 | 0.00 | 35.00 | 0.00 | 0.00 | 0.00 | 0.00 | 0.00 | 35.00 | 0.00 | 0.00 |
| % Calsol 850 (80.0° C. Aniline Point) | 0.00 | 0.00 | 0.00 | 0.00 | 35.00 | 0.00 | 0.00 | 0.00 | 0.00 | 0.00 | 35.00 | 0.00 |
| % Calsol 8240 (85.6° C. Aniline Point) | 0.00 | 0.00 | 0.00 | 0.00 | 0.00 | 35.00 | 0.00 | 0.00 | 0.00 | 0.00 | 0.00 | 35.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 27.80 | 18.80 | 18.70 | 19.30 | 12.20 | 8.00 | 35.00 | 35.00 | 34.10 | 35.00 | 35.00 | 35.00 |

TABLE VI

Compatibilities of Various Naphthenic Oils in Triol Based Prepolymers with and without TEGOSTAB ® B8240 at 35-Percent Oil Loading

| | Reference Numbers | | | | | | | | | | | |
|---|---|---|---|---|---|---|---|---|---|---|---|---|
| | VI-1 | VI-2 | VI-3 | VI-4 | VI-5 | VI-6 | VI-7 | VI-8 | VI-9 | VI-10 | VI-11 | VI-12 |
| % RUBINATE ® 9041 (2.45 functionality, 31.5% NCO) | 39.37 | 39.37 | 39.37 | 39.37 | 39.37 | 39.37 | 39.35 | 39.35 | 39.35 | 39.35 | 39.35 | 39.35 |
| % RUBINOL ® F455 (3000 Mw triol, 55 OH#) | 25.63 | 25.63 | 25.63 | 25.63 | 25.63 | 25.63 | 25.45 | 25.45 | 25.45 | 25.45 | 25.45 | 25.45 |
| % Calsol 804 (63.3° C. Aniline Point) | 35.00 | 0.00 | 0.00 | 0.00 | 0.00 | 0.00 | 35.00 | 0.00 | 0.00 | 0.00 | 0.00 | 0.00 |
| % Calsol 806 (69.4° C. Aniline Point) | 0.00 | 35.00 | 0.00 | 0.00 | 0.00 | 0.00 | 0.00 | 35.00 | 0.00 | 0.00 | 0.00 | 0.00 |
| % Calight RPO (72.2° C. Aniline Point) | 0.00 | 0.00 | 35.00 | 0.00 | 0.00 | 0.00 | 0.00 | 0.00 | 35.00 | 0.00 | 0.00 | 0.00 |
| % Calsol 810 (72.2° C. Aniline Point) | 0.00 | 0.00 | 0.00 | 35.00 | 0.00 | 0.00 | 0.00 | 0.00 | 0.00 | 35.00 | 0.00 | 0.00 |
| % Calsol 850 (80.0° C. Aniline Point) | 0.00 | 0.00 | 0.00 | 0.00 | 35.00 | 0.00 | 0.00 | 0.00 | 0.00 | 0.00 | 35.00 | 0.00 |
| % Calsol 8240 (85.6° C. Aniline Point) | 0.00 | 0.00 | 0.00 | 0.00 | 0.00 | 35.00 | 0.00 | 0.00 | 0.00 | 0.00 | 0.00 | 35.00 |
| % TEGOSTAB ® B8240 | 0.00 | 0.00 | 0.00 | 0.00 | 0.00 | 0.00 | 0.20 | 0.20 | 0.20 | 0.20 | 0.20 | 0.20 |
| % Oil Compatibility | 19.30 | 15.10 | 15.20 | 14.50 | 13.00 | 0.00 | 35.00 | 35.00 | 33.70 | 35.00 | 18.85 | 35.00 |

TABLE VII

Compatibilities of Various Paraffinic Oils in Diol Based Prepolymers with and without TEGOSTAB ® B8240 at 25-Percent Oil Loading

| | Reference Numbers | | | | | | | | | |
|---|---|---|---|---|---|---|---|---|---|---|
| | VII-1 | VII-2 | VII-3 | VII-4 | VII-5 | VII-6 | VII-7 | VII-8 | VII-9 | VII-10 |
| % RUBINATE ® 9041 (2.45 functionality, 31.5% NCO) | 40.57 | 40.57 | 40.57 | 40.57 | 40.57 | 40.54 | 40.54 | 40.54 | 40.54 | 40.54 |
| % RUBINOL ® F456 (2000 Mw diol, 56 OH#) | 34.43 | 34.43 | 34.43 | 34.43 | 34.43 | 34.26 | 34.26 | 34.26 | 34.26 | 34.26 |
| % SUNPAR ® LW 103 (60.5° C. Aniline Point) | 25.00 | 0.00 | 0.00 | 0.00 | 0.00 | 25.00 | 0.00 | 0.00 | 0.00 | 0.00 |
| % SUNPAR ® LW 104 (69.0° C. Aniline Point) | 0.00 | 25.00 | 0.00 | 0.00 | 0.00 | 0.00 | 25.00 | 0.00 | 0.00 | 0.00 |
| % SUNPAR ® LW 105 (77.8° C. Aniline Point) | 0.00 | 0.00 | 25.00 | 0.00 | 0.00 | 0.00 | 0.00 | 25.00 | 0.00 | 0.00 |
| % SUNPAR ® LW 107 (90.6° C. Aniline Point) | 0.00 | 0.00 | 0.00 | 25.00 | 0.00 | 0.00 | 0.00 | 0.00 | 25.00 | 0.00 |
| % SUNPAR ® LW 110 (101.7° C. Aniline Point) | 0.00 | 0.00 | 0.00 | 0.00 | 25.00 | 0.00 | 0.00 | 0.00 | 0.00 | 25.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 25.00 | 20.20 | 16.00 | 10.70 | 7.80 | 25.00 | 25.00 | 25.00 | 25.00 | 25.00 |

TABLE VIII

Compatibilities of Various Paraffinic Oils in Triol Based Prepolymers with and without TEGOSTAB ® B8240 at 25-Percent Oil Loading

| | Reference Numbers | | | | | | | | | |
|---|---|---|---|---|---|---|---|---|---|---|
| | VIII-1 | VIII-2 | VIII-3 | VIII-4 | VIII-5 | VIII-6 | VIII-7 | VIII-8 | VIII-9 | VIII-10 |
| % RUBINATE ® 9041 (2.45 functionality, 31.5% NCO) | 40.50 | 40.50 | 40.50 | 40.50 | 40.50 | 40.47 | 40.47 | 40.47 | 40.47 | 40.47 |
| % RUBINOL ® F455 (3000 Mw Triol, 55 OH#) | 34.50 | 34.50 | 34.50 | 34.50 | 34.50 | 34.33 | 34.33 | 34.33 | 34.33 | 34.33 |
| % SUNPAR ® LW 103 (60.5° C. Aniline Point) | 25.00 | 0.00 | 0.00 | 0.00 | 0.00 | 25.00 | 0.00 | 0.00 | 0.00 | 0.00 |
| % SUNPAR ® LW 104 (69.0° C. Aniline Point) | 0.00 | 25.00 | 0.00 | 0.00 | 0.00 | 0.00 | 25.00 | 0.00 | 0.00 | 0.00 |
| % SUNPAR ® LW 105 (77.8° C. Aniline Point) | 0.00 | 0.00 | 25.00 | 0.00 | 0.00 | 0.00 | 0.00 | 25.00 | 0.00 | 0.00 |
| % SUNPAR ® LW 107 (90.6° C. Aniline Point) | 0.00 | 0.00 | 0.00 | 25.00 | 0.00 | 0.00 | 0.00 | 0.00 | 25.00 | 0.00 |
| % SUNPAR ® LW 110 (101.7° C. Aniline Point) | 0.00 | 0.00 | 0.00 | 0.00 | 25.00 | 0.00 | 0.00 | 0.00 | 0.00 | 25.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 23.50 | 16.00 | 18.50 | 7.00 | 3.80 | 25.00 | 25.00 | 25.00 | 24.00 | 11.40 |

TABLE IX

Compatibilities of Various Paraffinic Oils in Diol Based Prepolymers with and without TEGOSTAB ® B8240 at 30-Percent Oil Loading

| | Reference Numbers | | | | | | | | | |
|---|---|---|---|---|---|---|---|---|---|---|
| | IX-1 | IX-2 | IX-3 | IX-4 | IX-5 | IX-6 | IX-7 | IX-8 | IX-9 | IX-10 |
| % RUBINATE ® 9041 (2.45 functionality, 31.5% NCO) | 39.99 | 39.99 | 39.99 | 39.99 | 39.99 | 39.97 | 39.97 | 39.97 | 39.97 | 39.97 |
| % RUBINOL ® F456 (2000 Mw diol, 56 OH#) | 30.01 | 30.01 | 30.01 | 30.01 | 30.01 | 29.83 | 29.83 | 29.83 | 29.83 | 29.83 |
| % SUNPAR ® LW 103 (60.5° C. Aniline Point) | 30.00 | 0.00 | 0.00 | 0.00 | 0.00 | 30.00 | 0.00 | 0.00 | 0.00 | 0.00 |
| % SUNPAR ® LW 104 (69.0° C. Aniline Point) | 0.00 | 30.00 | 0.00 | 0.00 | 0.00 | 0.00 | 30.00 | 0.00 | 0.00 | 0.00 |
| % SUNPAR ® LW 105 (77.8° C. Aniline Point) | 0.00 | 0.00 | 30.00 | 0.00 | 0.00 | 0.00 | 0.00 | 30.00 | 0.00 | 0.00 |
| % SUNPAR ® LW 107 (90.6° C. Aniline Point) | 0.00 | 0.00 | 0.00 | 30.00 | 0.00 | 0.00 | 0.00 | 0.00 | 30.00 | 0.00 |
| % SUNPAR ® LW 110 (101.7° C. Aniline Point) | 0.00 | 0.00 | 0.00 | 0.00 | 30.00 | 0.00 | 0.00 | 0.00 | 0.00 | 30.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 30.00 | 20.50 | 17.30 | 10.30 | 7.10 | 30.00 | 30.00 | 30.00 | 30.00 | 10.30 |

TABLE X

Compatibilities of Various Paraffinic Oils in Triol Based Prepolymers with and without TEGOSTAB ® B8240 at 30-Percent Oil Loading

| | Reference Numbers | | | | | | | | | |
|---|---|---|---|---|---|---|---|---|---|---|
| | X-1 | X-2 | X-3 | X-4 | X-5 | X-6 | X-7 | X-8 | X-9 | X-10 |
| % RUBINATE ® 9041 (2.45 functionality, 31.5% NCO) | 39.92 | 39.92 | 39.92 | 39.92 | 39.92 | 39.90 | 39.90 | 39.90 | 39.90 | 39.90 |
| % RUBINOL ® F455 (3000 Mw Triol, 55 OH#) | 30.08 | 30.08 | 30.08 | 30.08 | 30.08 | 29.90 | 29.90 | 29.90 | 29.90 | 29.90 |
| % SUNPAR ® LW 103 (60.5° C. Aniline Point) | 30.00 | 0.00 | 0.00 | 0.00 | 0.00 | 30.00 | 0.00 | 0.00 | 0.00 | 0.00 |
| % SUNPAR ® LW 104 (69.0° C. Aniline Point) | 0.00 | 30.00 | 0.00 | 0.00 | 0.00 | 0.00 | 30.00 | 0.00 | 0.00 | 0.00 |
| % SUNPAR ® LW 105 (77.8° C. Aniline Point) | 0.00 | 0.00 | 30.00 | 0.00 | 0.00 | 0.00 | 0.00 | 30.00 | 0.00 | 0.00 |
| % SUNPAR ® LW 107 (90.6° C. Aniline Point) | 0.00 | 0.00 | 0.00 | 30.00 | 0.00 | 0.00 | 0.00 | 0.00 | 30.00 | 0.00 |
| % SUNPAR ® LW 110 (101.7° C. Aniline Point) | 0.00 | 0.00 | 0.00 | 0.00 | 30.00 | 0.00 | 0.00 | 0.00 | 0.00 | 30.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 22.30 | 13.90 | 13.20 | 9.10 | 5.40 | 28.60 | 29.50 | 29.50 | 14.60 | 8.70 |

TABLE XI

Compatibilities of Various Paraffinic Oils in Diol Based Prepolymers with and without TEGOSTAB ® B8240 at 35-Percent Oil Loading

| | Reference Numbers | | | | | | | | | |
|---|---|---|---|---|---|---|---|---|---|---|
| | XI-1 | XI-2 | XI-3 | XI-4 | XI-5 | XI-6 | XI-7 | XI-8 | XI-9 | XI-10 |
| % RUBINATE ® 9041 (2.45 functionality, 31.5% NCO) | 39.42 | 39.42 | 39.42 | 39.42 | 39.42 | 39.40 | 39.40 | 39.40 | 39.40 | 39.40 |
| % RUBINOL ® F456 (2000 Mw diol, 56 OH#) | 25.58 | 25.58 | 25.58 | 25.58 | 25.58 | 25.40 | 25.40 | 25.40 | 25.40 | 25.40 |
| % SUNPAR ® LW 103 (60.5° C. Aniline Point) | 35.00 | 0.00 | 0.00 | 0.00 | 0.00 | 35.00 | 0.00 | 0.00 | 0.00 | 0.00 |
| % SUNPAR ® LW 104 (69.0° C. Aniline Point) | 0.00 | 35.00 | 0.00 | 0.00 | 0.00 | 0.00 | 35.00 | 0.00 | 0.00 | 0.00 |
| % SUNPAR ® LW 105 (77.8° C. Aniline Point) | 0.00 | 0.00 | 35.00 | 0.00 | 0.00 | 0.00 | 0.00 | 35.00 | 0.00 | 0.00 |
| % SUNPAR ® LW 107 (90.6° C. Aniline Point) | 0.00 | 0.00 | 0.00 | 35.00 | 0.00 | 0.00 | 0.00 | 0.00 | 35.00 | 0.00 |
| % SUNPAR ® LW 110 (101.7° C. Aniline Point) | 0.00 | 0.00 | 0.00 | 0.00 | 35.00 | 0.00 | 0.00 | 0.00 | 0.00 | 35.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 25.60 | 18.80 | 0.00 | 10.60 | 5.30 | 33.90 | 34.10 | 34.60 | 15.90 | 10.60 |

TABLE XII

Compatibilities of Various Paraffinic Oils in Triol Based Prepolymers with and without TEGOSTAB ® B8240 at 35-Percent Oil Loading

| | Reference Numbers | | | | | | | | | |
|---|---|---|---|---|---|---|---|---|---|---|
| | XII-1 | XII-2 | XII-3 | XII-4 | XII-5 | XII-6 | XII-7 | XII-8 | XII-9 | XII-10 |
| % RUBINATE ® 9041 (2.45 functionality, 31.5% NCO) | 39.37 | 39.37 | 39.37 | 39.37 | 39.37 | 39.35 | 39.35 | 39.35 | 39.35 | 39.35 |
| % RUBINOL ® F455 (3000 Mw Triol, 55 OH#) | 25.63 | 25.63 | 25.63 | 25.63 | 25.63 | 25.45 | 25.45 | 25.45 | 25.45 | 25.45 |
| % SUNPAR ® LW 103 (60.5° C. Aniline Point) | 35.00 | 0.00 | 0.00 | 0.00 | 0.00 | 35.00 | 0.00 | 0.00 | 0.00 | 0.00 |
| % SUNPAR ® LW 104 (69.0° C. Aniline Point) | 0.00 | 35.00 | 0.00 | 0.00 | 0.00 | 0.00 | 35.00 | 0.00 | 0.00 | 0.00 |
| % SUNPAR ® LW 105 (77.8° C. Aniline Point) | 0.00 | 0.00 | 35.00 | 0.00 | 0.00 | 0.00 | 0.00 | 35.00 | 0.00 | 0.00 |
| % SUNPAR ® LW 107 (90.6° C. Aniline Point) | 0.00 | 0.00 | 0.00 | 35.00 | 0.00 | 0.00 | 0.00 | 0.00 | 35.00 | 0.00 |
| % SUNPAR ® LW 110 (101.7° C. Aniline Point) | 0.00 | 0.00 | 0.00 | 0.00 | 35.00 | 0.00 | 0.00 | 0.00 | 0.00 | 35.00 |
| % TEGOSTAB ® B8240 | 0.00 | 0.00 | 0.00 | 0.00 | 0.00 | 0.20 | 0.20 | 0.20 | 0.20 | 0.20 |
| % Oil Compatibility | 20.70 | 16.70 | 21.40 | 6.30 | 3.50 | 31.80 | 33.20 | 27.20 | 8.00 | 8.00 |

ADDITIONAL EXAMPLES

A) Comparative Examples

Base Isocyanate Compatibility:

The following two experiments were conducted in order to determine the natural solubility of a napthenic oil in certain monomeric base isocyanate blends:

i) A blend is made by mixing of 75% by wt. of RUBINATE® M with 25% by wt. Calsol 806. The blend was stored without agitation for 3 days at 30° C., after which time it was observed to have separated. The separated oil was removed by pipette. The oil compatibility in this base isocyanate was calculated, based on the weight of oil removed, to be 8.57% by wt. relative to the total final weight of the sample.

ii) A blend is made by mixing 75% by wt. of RUBINATE® 9041 with 25% by wt. Calsol 806. The blend was stored without agitation for 3 days at 30° C., after which time it was observed to have separated. The separated oil was removed by pipette. The oil compatibility in this base isocyanate was calculated, based on the weight of the oil removed, to be 10.69% by wt. relative to the total final weight of the sample.

The comparative Examples A show that the natural compatibility of the napthenic oil with the base isocyanate is low (typically around 10% by wt. or less).

B) According to the Invention

Prepolymers of Diols having different Structures:

i) A prepolymer is made by reacting 40.5% by wt. of RUBINATE® 9041 isocyanate with 34.5% by wt. of RUBINOL® F-456 polyol in the presence of 25% by wt. Calsol 806. The ingredients are mixed by vigorous manual shaking in a jar for 30 seconds, and then heated for 15 hours at 45° C. under dry air. The resulting prepolymer is then stored for 3 days at 30° C. in the absence of agitation, at which time the sample is observed to have separated. The excess oil is removed by pipette and the compatibility in the prepolymer is calculated to be 19.60% by wt., based on the total final sample wt.

ii) A prepolymer is prepared by reacting 38.5% by wt. of RUBINATE® 9041 isocyanate with 36.5% by wt. of RUBINOL® F-459 polyol in the presence of 25% by wt. Calsol 806. The ingredients were mixed by vigorous manual shaking in a jar for 30 seconds, and then heated for 15 hours at 45° C. under dry air. The resulting prepolymer is then stored for 3 days at 30° C. in the absence of agitation, at which time the sample is observed to have separated. The excess oil is removed by pipette and the oil compatibility in the prepolymer is calculated to be 17.43% by wt., based on the total final sample wt.

What is claimed is:

1. An isocyanate terminated prepolymer which is liquid at 25° C. and has a viscosity at 25° C. in the range of 300 to 4000 cps, comprising:
   A) the reaction product of a nominal polyether diol having a number averaged molecular weight between 300 and 8000, with a stoiciometric excess of an organic monomeric base polyisocyanate having a number averaged isocyanate functionality of from 2.2 to 3.0;
   B) a process oil in an amount greater than 12% by weight of the prepolymer composition; and
   C) optionally a compatibilizing agent;
   wherein the prepolymer is stable with respect to bulk separation of the process oil for a period of at least 3 days at 30° C. in the absence of agitation.

2. The prepolymer of claim 1, wherein the process oil comprises greater than 20% by weight of the prepolymer composition.

3. The prepolymer of claim 2, wherein the process oil is a napthenic hydrocarbon oil.

4. The prepolymer of claim 3, wherein the organic monomeric polyisocyanate is a mixture of diphenylmethane diisocyanate isomers and higher polymethylene polyphenyl polyisocyanate oligomers of functionality 3 or greater.

5. The prepolymer of claim 2, wherein the compatibility of the process oil with the organic monomeric base polyisocyanate is not greater than 20% by weight after 3 days storage at 30° C. in the absence of agitation.

6. An isocyanate terminated prepolymer which is liquid at 25° C. and has a viscosity at 25° C. in the range of 300 to 4000 cps, consisting essentially of:
   A) the reaction product of a nominal polyether diol having a number averaged molecular weight between 300 and 8000, with a stoiciometric excess of an organic monomeric base polyisocyanate having a number averaged isocyanate functionality of from 2.2 to 3.0;
   B) a process oil in an amount greater than 12% by weight of the prepolymer composition; and
   C) optionally a compatibilizing agent;
   wherein the prepolymer is stable with respect to bulk separation of the process oil for a period of at least 3 days at 30° C. in the absence of agitation.

7. The prepolymer of claim 6, wherein the process oil comprises greater than 20% by weight of the prepolymer composition.

8. The prepolymer of claim 7, wherein the process oil is a napthenic hydrocarbon oil.

9. The prepolymer of claim 8, wherein the organic monomeric polyisocyanate is a mixture of diphenylmethane diisocyanate isomers and higher polymethylene polyphenyl polyisocyanate oligomers of functionality 3 or greater.

10. The prepolymer of claim 7, wherein the compatibility of the process oil with the organic monomeric base polyisocyanate is not greater than 20% by weight after 3 days storage at 30° C. in the absence of agitation.

* * * * *